(12) United States Patent
Blodt (10) Patent No.: US 10,224,597 B2
(45) Date of Patent: Mar. 5, 2019

(54) ANTENNA ARRANGEMENT FOR A FILL-LEVEL MEASURING DEVICE

(71) Applicant: Endress + Hauser GmbH + Co. KG, Maulburg (DE)

(72) Inventor: Thomas Blodt, Basel (CH)

(73) Assignee: ENDRESS+HAUSER SE+CO. KG, Maulberg (DE)

(*) Notice: Subject to any disclaimer, the term of this patent is extended or adjusted under 35 U.S.C. 154(b) by 372 days.

(21) Appl. No.: 14/900,731

(22) PCT Filed: Jun. 4, 2014

(86) PCT No.: PCT/EP2014/061618
§ 371 (c)(1),
(2) Date: Dec. 22, 2015

(87) PCT Pub. No.: WO2015/000656
PCT Pub. Date: Jan. 8, 2015

(65) Prior Publication Data
US 2016/0138957 A1    May 19, 2016

(30) Foreign Application Priority Data
Jul. 3, 2013  (DE) .......................... 10 2013 106 978

(51) Int. Cl.
*H01Q 1/22*    (2006.01)
*H01Q 1/42*    (2006.01)
(Continued)

(52) U.S. Cl.
CPC ........... *H01Q 1/225* (2013.01); *G01F 23/284* (2013.01); *H01Q 1/42* (2013.01); *H01Q 13/02* (2013.01); *H01Q 15/08* (2013.01); *H01Q 19/062* (2013.01)

(58) Field of Classification Search
CPC ..... G01F 13/284; G01F 23/284; H01Q 1/225; H01Q 19/062; H01Q 15/08; H01Q 1/42; H01Q 13/02
(Continued)

(56) References Cited

U.S. PATENT DOCUMENTS 4,210,915 A * 7/1980 Kienberger ............ H01Q 13/02
343/772
5,305,237 A * 4/1994 Dalrymple ............ G01F 23/284
324/644
(Continued)

FOREIGN PATENT DOCUMENTS

DE        8712053.4       12/1987
DE    102005022493 A1    11/2006
(Continued)

OTHER PUBLICATIONS

German Search Report, German Patent Office, Munich, DE, dated Mar. 12, 2014.
(Continued)

*Primary Examiner* — Matthew M Barker
(74) *Attorney, Agent, or Firm* — Bacon & Thomas, PLLC (57) ABSTRACT

Antenna arrangement for a fill-level measuring device for ascertaining and monitoring a fill level of a medium in a container by means of a microwave, travel-time measurement method, comprising a horn antenna having a horn shaped component for focusing microwaves and a microwave transmissive, process isolating element, which is provided in the region of the exit opening of the horn shaped component facing the medium and which isolates the interior of the horn shaped component from the interior of the container. There is provided for additional focusing of the microwaves a lengthening component, which lengthens the horn shaped component in the radiated direction of the microwaves. The process isolating element is embodied and (Continued)

arranged in such a manner that it isolates the horn shaped component and the lengthening component galvanically from one another.

7 Claims, 7 Drawing Sheets (51) Int. Cl.
H01Q 13/02 (2006.01)
G01F 23/284 (2006.01)
H01Q 15/08 (2006.01)
H01Q 19/06 (2006.01)

(58) Field of Classification Search
USPC .......................................................... 342/124
See application file for complete search history.

(56) References Cited

U.S. PATENT DOCUMENTS

| | | | | |
|---|---|---|---|---|
| 5,507,181 A * | 4/1996 | Fox | ................... | G01F 23/284 342/124 |
| 6,325,391 B1 | 12/2001 | Smith | | |
| 6,859,187 B2 | 2/2005 | Ohlsson | | |
| 7,259,712 B1 * | 8/2007 | McKeen | ............... | G01F 23/284 324/644 |
| 7,602,330 B2 * | 10/2009 | Serban | .................. | H01Q 13/02 324/644 |
| 7,864,104 B2 | 1/2011 | Chen | | |
| 7,872,610 B2 | 1/2011 | Motzer | | |
| 7,940,207 B1 * | 5/2011 | Kienzle | ................ | G01F 23/284 342/124 |
| 8,040,274 B2 * | 10/2011 | Wendler | ................ | G01F 23/284 324/364 |
| 8,242,965 B2 * | 8/2012 | Gerding | ................ | G01F 23/284 343/753 |
| 8,279,130 B2 * | 10/2012 | Dietmeier | ............. | G01F 23/284 342/118 |
| 8,350,751 B2 * | 1/2013 | Edvardsson | ........... | H01Q 1/225 342/124 |
| 8,354,970 B2 * | 1/2013 | Armbrecht | ............. | H01Q 1/225 343/772 |
| 8,482,296 B2 | 7/2013 | Reimelt | | |
| 9,091,584 B2 * | 7/2015 | Vogt | ..................... | G01F 23/284 |
| 2002/0053238 A1 * | 5/2002 | Fahrenbach | .......... | G01F 23/284 73/290 R |
| 2002/0066314 A1 | 6/2002 | Lubbers | | |
| 2003/0179148 A1 * | 9/2003 | Ohlsson | ................ | G01F 23/284 343/786 |
| 2006/0000274 A1 * | 1/2006 | Kallsand | ............... | G01F 23/284 73/290 V |
| 2007/0188396 A1 | 8/2007 | Griessbaum | | |
| 2012/0169527 A1 * | 7/2012 | Edvardsson | .......... | G01F 23/284 342/124 |

FOREIGN PATENT DOCUMENTS

| | | |
|---|---|---|
| DE | 112004001988 T5 | 12/2006 |
| DE | 102005036844 A1 | 2/2007 |
| DE | 102005056042 A1 | 5/2007 |
| DE | 102006003742 A1 | 8/2007 |
| EP | 1211490 A2 | 6/2002 |
| EP | 1336224 B1 | 8/2003 |
| EP | 1485683 B1 | 12/2004 |
| WO | 0241446 A1 | 3/2002 |
| WO | 2005038414 A1 | 4/2005 |

OTHER PUBLICATIONS

International Search Report, EPO, The Netherlands, dated Aug. 26, 2014.
English Translation of the International Preliminary Report on Patentability, WIPO, Geneva, CH, dated Jan. 14, 2016.

* cited by examiner

ANTENNA ARRANGEMENT FOR A FILL-LEVEL MEASURING DEVICE

TECHNICAL FIELD

The invention relates to an antenna arrangement for a fill-level measuring device for ascertaining and monitoring a fill level of a medium in a container.

BACKGROUND DISCUSSION

In fill level measurement, microwaves are sent by means of an antenna toward the surface of a fill substance, and the echo waves reflected on the surface are received. The echo waves are preferably plotted as an echo function, from which the travel time is determined. From the travel time, the separation between the surface of the fill substance and the antenna is determined.

All known methods can be applied, which enable measuring of relatively short distances by means of reflected microwaves. The best known examples are pulse radar and frequency modulation continuous wave radar (FMCW radar).

In the case of pulse radar, periodically, broadband microwave transmission pulses, in the following referred to as microwaves, are sent, which are reflected from the surface of the fill substance and after a distance dependent travel time received back. The received signal amplitude plotted as a function of time represents the echo function. Each value of the echo function corresponds to the amplitude of an echo wave reflected at a certain separation from the antenna.

In the case of the FMCW method, a continuous microwave is sent, which is periodically linearly frequency modulated, for example, according to a sawtooth function. The frequency of the received echo signal has, consequently, compared with the instantaneous frequency, which, the transmission signal has at the point in time of receipt, a frequency difference, which depends on the travel time of the echo signal. The frequency difference between transmission signal and received signal, which can be won by mixing the two signals and evaluating the Fourier spectrum of the mixed signal, corresponds, thus, to the separation of the surface of the fill substance from the antenna. Furthermore, the amplitudes of the spectral lines of the frequency spectrum won by the Fourier transformation correspond to the echo amplitudes. This Fourier spectrum represents, consequently, the echo function for this case.

Fill level measuring devices working with microwaves are applied in many branches of industry, e.g. in the chemicals industry and in the foods industry. Typically, the fill level in a container must be measured. The containers usually have an opening, at which a nozzle or, a flange is provided for securement of measuring devices.

Depending on application, usually parabolic-, horn- or rod- or patch antennas are applied in fill level measuring technology. Horn antennas are basically constructed such that a funnel shaped metal horn is formed on a hollow conductor in the direction facing the fill substance. The construction of a parabolic antenna can be described in simple manner that the microwaves are guided in a hollow conductor and radiated out, and/or coupled back in, in the focal point of the parabolic mirror directly or by means of a reflector. A rod antenna is composed basically of a hollow conductor, which is filled at least partially with a rod of a dielectric and which has in the direction facing the fill substance a coupling structure in the shape of a taper or a cone. These three freely radiating antenna types are usually fed via a coaxial cable, which is connected to an exciter element protruding into the hollow conductor.

If one, selects a horn antenna with a relatively large exit opening, less divergent signal fractions result. One speaks of a focusing in a radiated direction. The conventional measure for the focusing is the so-called "3 dB lobe width". This tells at which angle of the radiated, respectively received, power fraction of the microwaves has declined to exactly half of the maximum value in the radiated direction. If one selects a relatively large exit opening of the horn antenna, the length of the horn antenna must be correspondingly matched, in order to avoid so-called "side lobes". Side lobes are other maxima of the power fractions of the microwaves, which are not directed in the radiated direction.

Antenna arrangements for fill level measurement have the goal of achieving a large focusing effect. This means focusing more power fractions with targeting in a radiated direction. This is especially advantageous in the case of very large distances between the antenna arrangement and the medium in the range of 30 . . . 80 m, as well as in the case of surfaces of the medium, which reflect back only a small power fraction into the antenna. Reasons for a small fraction of back reflected power fractions can include a small dielectric constant of the medium, in which the microwaves are transmitted, absorption in the case of bulk goods, as well as a wavy surface (for example, because a stirrer is present), whereby power fractions are reflected back in other directions than in the direction of the antenna arrangement.

If a stirrer is arranged in the container, which leads to deflection of the microwaves in other directions than the radiated direction, this effect can be weakened with a horn antenna having a smaller focusing effect. Moreover, there is, for reasons of cost, interest in horn antennas with smaller horn diameters, especially in the case of horn antennas of stainless steel. Since the mounting usually takes place outside of the container, the maximum possible horn diameter is further fixed by the flange diameter, since the horn in the case of this mounting must pass through this.

European application, EP 1 485 683 B1 describes a horn antenna for a radar, fill-level measuring device for determining a fill level of a medium in a container. The horn antenna includes a first conductive housing, whose inner space is filled with a dielectric body. A second conductive housing lengthens the first housing in radiated direction of the microwaves.

Since the second housing of the horn antenna is electrically conductively and is electrically connected with the first housing, after a certain fill level of the medium in the container, an electrically conductive connection between the horn antenna and the medium can arise, along with an electrically conductive connection between the horn antenna and the container. This can lead to a so-called "ground loop", as well as also to short circuits and explosions.

SUMMARY OF THE INVENTION

An object of the invention is to provide for a fill-level measuring device an antenna arrangement, which offers increased safety.

The object is achieved by the subject matter of the invention. The subject matter of the invention relates to an antenna arrangement for a fill-level measuring device for ascertaining and monitoring a fill level of a medium in a container by means of a microwave, travel-time measurement method, comprising a horn antenna having a horn shaped component for focusing microwaves and a microwave transmissive, process isolating element, which is provided in the region of the exit opening of the horn shaped component facing the medium and which isolates the inner space of the horn shaped component from the inner space of the container, wherein there is provided for additional focusing of the microwaves a lengthening component, which lengthens the horn shaped component in the radiated direction of the microwaves, wherein the process isolating element is embodied and arranged in such a manner that it isolates the horn shaped component and the lengthening component galvanically from one another.

Because of the galvanic isolation between the lengthening component and the horn shaped component, the lengthening component lies not such as the horn shaped component at ground potential. Electrical charging of the lengthening component can no longer drain to ground, whereby the safety of the antenna arrangement is increased.

In a further development, the horn antenna is at least partially arranged in a housing, wherein the lengthening component has at least one securement component, and wherein the lengthening component is secured to the housing by means of the at least one securement component.

In a further development, the process isolating element is essentially embodied disc shaped and dimensioned in the radial direction larger than the exit opening of the horn shaped component. Advantageous for this embodiment is that the process isolating element separates the horn shaped component and the lengthening component galvanically.

In a further development, the process isolating element is secured to the housing in an edge region. Advantageous in this embodiment is that an inner space of the housing is isolated from an inner space of the container.

In a further development, there is associated with the at least one securement component at least one electrically conducting, hollow cylinder, which surrounds the process isolating element in the radial direction, so that microwaves, which escape in the radial direction from the edge region of the process isolating element, are reflected back approximately loss-freely.

In an additional form of embodiment, there is associated with the at least one securement component at least one annular cavity resonator, which surrounds the process isolating element in the radial direction, and is so dimensioned that microwaves, which escape in the radial direction from the edge region of the process isolating element, are reflected back approximately loss-freely.

In a further development, the hollow cylinder or the cavity resonator is embodied in such a way that microwaves, which escape from the edge region of the process isolating element, are reflected back on an inner wall of the hollow cylinder or of the cavity resonator according to an integer multiple of the half wavelength.

In a further development, the lengthening component is embodied horn shaped in such a way that the lengthening component aligns with the horn shaped component.

In an additional form of embodiment, the lengthening component is embodied horn shaped and has an aperture angle, which corresponds approximately to an aperture angle of the horn shaped component, and the lengthening component includes an entrance opening, which is less or greater than the exit opening of the horn shaped component.

Alternatively, the aperture angle of the lengthening component can be selected deviating from the aperture angle of the horn shaped component. Advantageous is especially an increasing aperture angle with increasing widening of the lengthening component. For example, the aperture angle of the horn shaped lengthening component can be selected larger than the aperture angle of the horn shaped component.

In an additional form of embodiment, the lengthening component is embodied in the form of a hollow cylinder, wherein the lengthening component has an entrance opening, whose diameter is less than the diameter of the lengthening component, wherein the lengthening component is secured in the edge region of the entrance opening to the edge region of the process element, so that the lengthening component has a step in the radiated direction.

In a further development, the lengthening component is dimensioned in such a way that a $TM_{11}$ mode is produced with an annular region, in which the field strength is minimum, and that the annular region has a diameter, which corresponds approximately to the diameter of the process isolating element.

In a further development, the lengthening component has a length of at least 8 times, preferably at least 16 times, the wavelength of the microwaves. Because of this dimensioning, there is present at an exit opening of the lengthening component a $TE_{11}$ mode and a $TM_{11}$ mode in suitable power fractions, in order interactively to build an approximately linearly polarized field distribution for increased focusing.

In a further development, the lengthening component has a diameter of at most three times the diameter of the process isolating element and at least three times the diameter of the exit opening of the horn shaped component. By this dimensioning, there is present at an exit opening of the lengthening component a $TE_{11}$ mode and a $TM_{11}$ mode in suitable power fractions, in order to build an approximately linearly polarized field distribution for increased focusing.

In a further development, an exit opening of the lengthening component is embodied horn shaped for additional focusing of the microwaves, or it has the shape of an exponential funnel.

In a further development, the process isolating element includes a dielectric lens for more extensive focusing of the microwaves.

An object of the invention is likewise achieved by a fill-level measuring device for ascertaining and monitoring a fill level of a medium in a container by means of a microwave, travel-time measurement method, comprising a measurement transmitter and an antenna arrangement of the invention.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
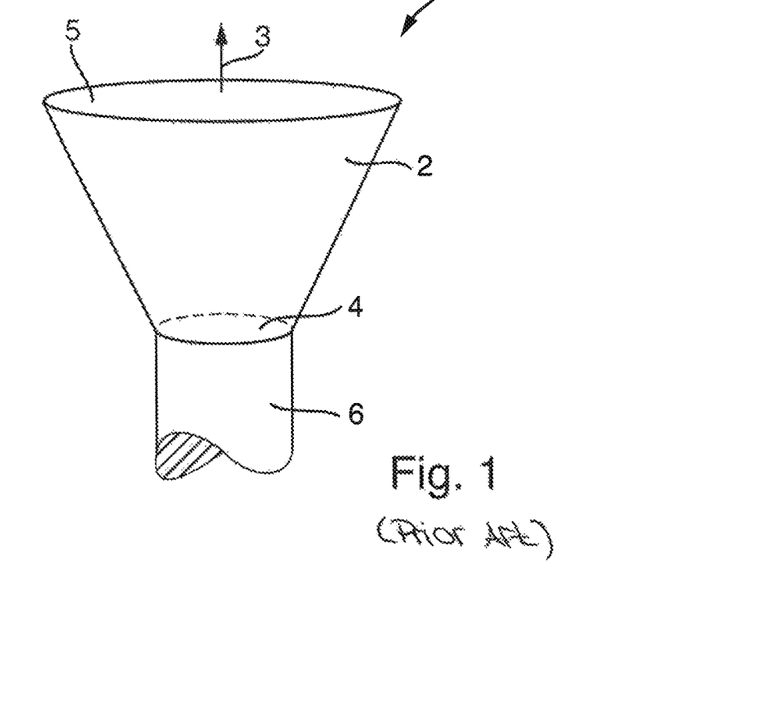
FIG. 1 is an antenna arrangement comprising a horn antenna with a round hollow conductor according to the state of the art.

FIG. 1 shows an antenna arrangement 1 for a fill-level measuring device for ascertaining and monitoring a fill level of a medium in a container by means of a microwave, travel-time measurement method with a horn antenna for focusing the microwaves. The horn antenna is composed of a horn shaped component 2, which is conically embodied and has a circular cross sectional area. The cross section widens in the radiated direction 3, so that an entrance opening 4 of the horn shaped component 2 has a lesser diameter than an exit opening 5 of the horn shaped component 2. This widening achieves an as reflection free as possible transition from the entrance opening 4 to the exit opening 5 of the horn shaped component 2.

The entrance opening 4 of the horn shaped component 2 is connected with a round, hollow conductor 6 and the round, hollow conductor 6 is connected with an electronics. The electronics produces an electrical signal, which is converted in the round, hollow conductor 6 into microwaves, wherein the microwaves are radiated by means of the horn shaped component 2. A great part of the microwaves is radiated parallel to a normal of the exit opening 5, wherein this direction is referred to as the radiated direction 3.

If the widening of the horn shaped component 2 is selected as large as possible, a very planar field distribution of the radiated microwave results, in the case of which only a very small part of the microwaves is not radiated in the radiated direction 3.

Figure 2:
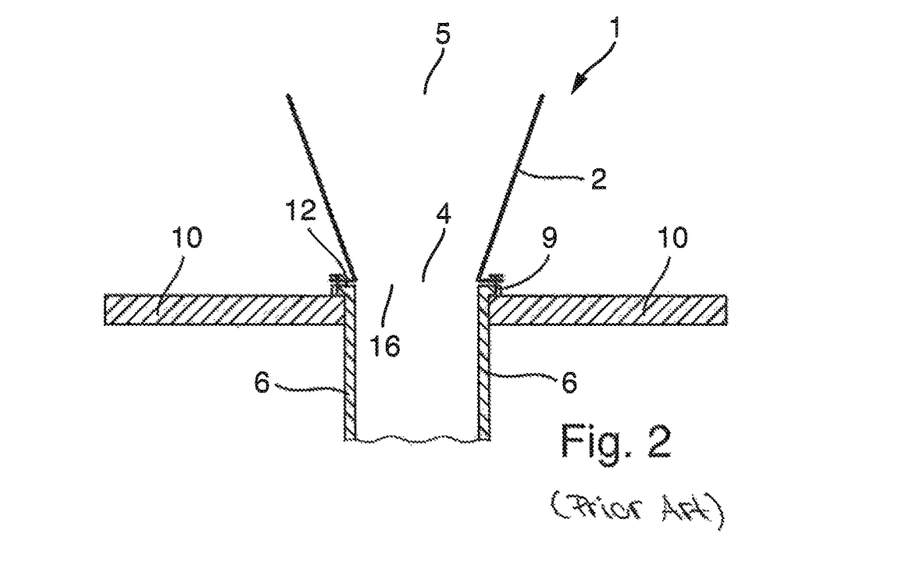
FIG. 2 is an antenna arrangement comprising a horn antenna with a round hollow conductor and flange according to the state of the art.

FIG. 2 shows another embodiment of an antenna arrangement 1 according to the state of the art, in the case of which the round, hollow conductor 6 has a tube flange 9 externally at an exit opening 16. The horn shaped component 2 includes at an entrance opening 4 an outer flange 12, which is embodied suitably for fitting the tube flange 9 of the round, hollow conductor 6. The tube flange 9 of the round, hollow conductor 6 and the outer flange 12 of the horn shaped component 2 are connected by means of screws 31. Furthermore, the round, hollow conductor 6 is arranged in an opening of a flange 10. The antenna arrangement 1 can be secured on a container by means of the flange 10.

Figure 3:
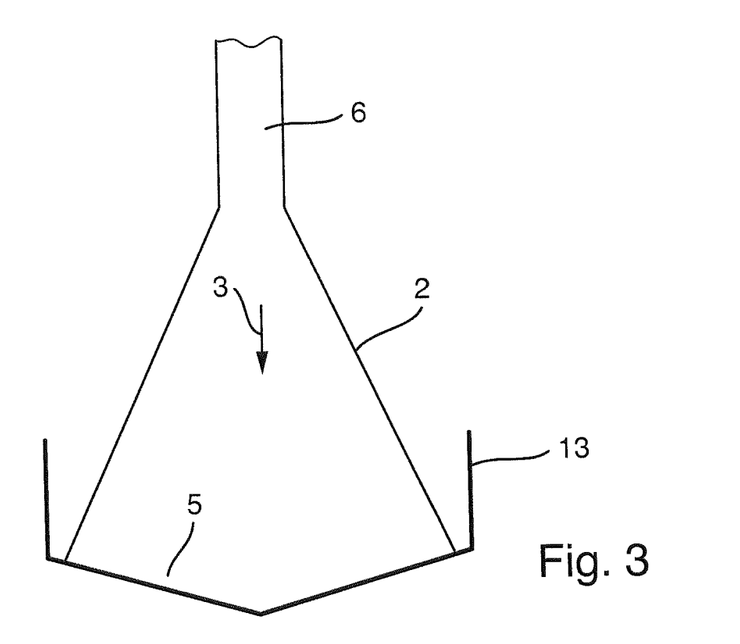
FIG. 3 is an antenna arrangement comprising a horn antenna having a horn shaped component and a process isolating element according to the state of the art.

FIG. 3 shows a further example of an embodiment of an antenna arrangement 1 of the state of the art. A horn shaped component 2 of a horn antenna is connected electrically with a round, hollow conductor 6. The round, hollow conductor 6 is connected with an electronics (not shown). An exit opening 5 of the horn shaped component 2 is sealed by means of a process isolating element 13, so that the inner space of the horn shaped component 2 is isolated from the interior of the container. The process isolating element 13 is disc shaped and dimensioned larger in the radial direction than the exit opening 5 of the horn antenna 2.

Figure 4:
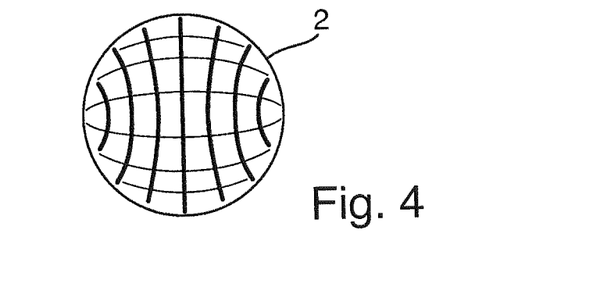
FIG. 4 is a TE11 mode in a round hollow conductor.

FIG. 4 shows a $TE_{11}$ mode in a round, hollow conductor 2. Since the round, hollow conductor 6 is electrically conductive, the $TE_{11}$ mode has large field fractions in the vicinity of the round, hollow conductor 2.

Figure 5A:
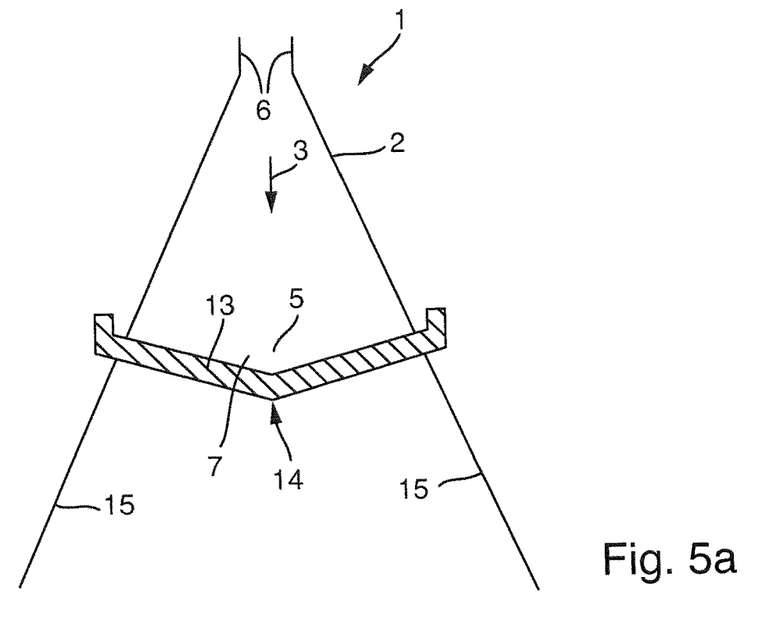
FIG. 5a is an antenna arrangement of the invention having a horn shaped component and a lengthening component, which aligns with the horn shaped component.

FIG. 5a shows an antenna arrangement 1 of the invention. A horn antenna is composed of a horn shaped component 2 and a process isolating element 13, which closes an exit opening 5 the horn shaped component 2. The horn shaped component 2 is located in a housing (not shown in FIG. 5). The antenna arrangement 1 further includes for additional focusing of the microwaves a lengthening component 15, which lengthens the horn shaped component 2 in the radiated direction 3 of the microwaves. According to the invention, the process isolating element 13 is embodied and arranged in such a manner that it isolates the horn shaped component 2 and the lengthening component 15 galvanically from one another.

The process isolating element 13 is transmissive for microwaves. It is composed of a material preferably transmissive for microwaves, such as e.g. Teflon or preferably undoped PP. A thickness of the process isolating element 13 depends on specifications, such as, for example, specifications relative to stability (VDE) or relative to explosion protection (ATEX).

The horn shaped component 2 is composed of thin sheet material, for example, brass or a conductive plastic or a plastic, which is metallized on its surface. For manufacturing reasons, the horn shaped component 2 is rotationally symmetric and embodied as one-piece with the round, hollow conductor 6. The horn shaped component 2 and/or the round, hollow conductor 2 can, however, also be embodied ovally or elliptically. Depending on how the microwaves couple into the round, hollow conductor 6, an elliptical, horn shaped component 2 and/or an elliptical, round, hollow conductor 6 is advantageous. Through an elliptical horn shaped component 2, a focusing in a direction, which does not corresponds to the radiated direction 3, can be corrected. Such a focusing in an undesired direction results usually in the case of horn antennas, in the case of which the horn shaped component 2 is relatively small in comparison to the wavelength. The focusing in an undesired direction is essentially caused in the case of the in-coupling of the microwaves.

Furthermore, the process isolating element 13 comes to a point 14 in the radiated direction 3. If the medium condenses on the process isolating element 13, the condensate drops via the point 14. In this way, condensation of the medium on the process isolating element 13 is reduced.

Lengthening component 15 is embodied horn shaped and has an aperture angle, which agrees with the aperture angle of the horn shaped component 2. An entrance opening 7 of the lengthening component 15 is suitably embodied to fit an exit opening 5 of the horn shaped component 2, such that the horn shaped component 2 aligns with the lengthening component 15.

Figure 5B:
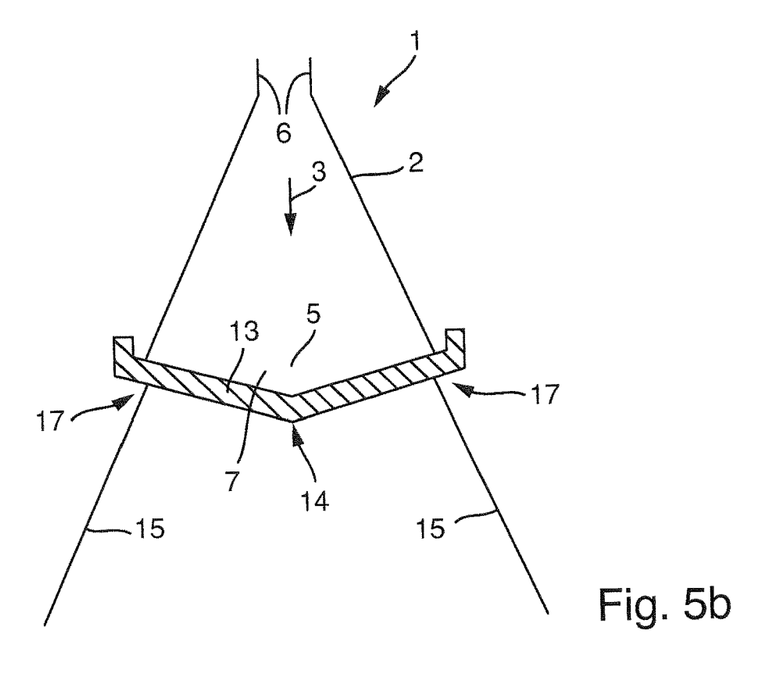
FIG. 5b is an antenna arrangement of the invention having a horn shaped component and a lengthening component, which is arranged offset from the horn shaped component.

FIG. 5b shows an embodiment of an antenna arrangement 1 of the invention corresponding to FIG. 5a, in the case of which the horn shaped component 2 and the lengthening component 15 have, indeed, the same aperture angle, however, an entrance opening 7 of the lengthening component 15 is embodied smaller than an exit opening 5 the horn shaped component 2. This leads to an offset 17 of the lengthening component 15 from the horn shaped component 2. The offset 17 leads to the fact that microwaves are radiated laterally as well as suffer reflections, such that the antenna gain is degraded by about 1-2 dB.

Figure 6A:
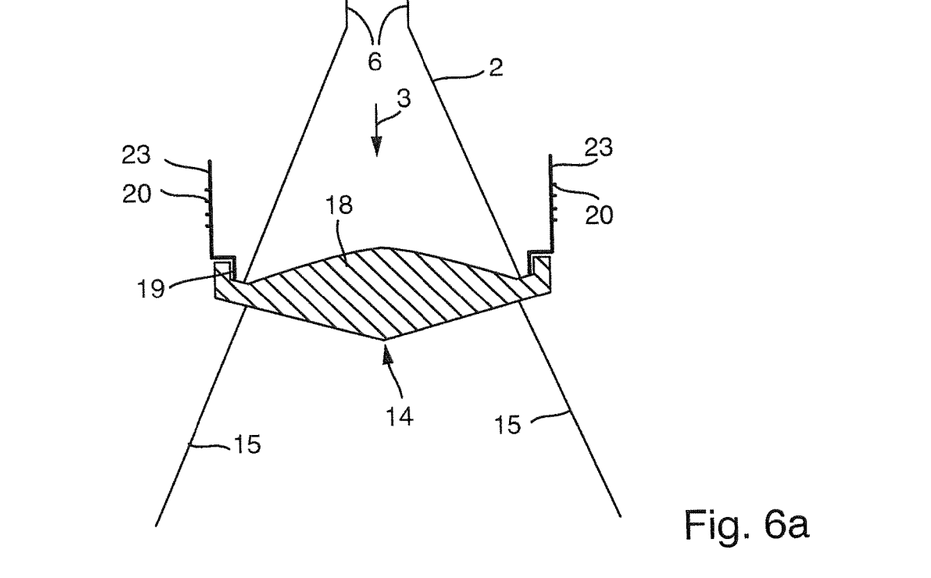
FIG. 6a is an antenna arrangement of the invention with a process isolating element, in which a dielectric lens is arranged.

FIG. 6a shows another embodiment of an antenna arrangement 1 of the invention with a process isolating element 13, in which a dielectric lens 18 is arranged. In this way, the antenna gain can be improved. The lens 18 is composed, for example, of Teflon, polypropylene (PP), polyetheretherketone (PEEK), polyethylene (PE) or ethylene-tetrafluoroethylene (ETFE). Alternatively, the lens 18 can be arranged on the process isolating element 13. In this case, the horn shaped component 2 can be filled with a dielectric. This favors especially robustness against condensate of the medium and provides a price favorable antenna arrangement 1 for the waste water field.

Furthermore, the horn shaped component 2 is arranged in a housing 23. The process isolating element 13 is screwed onto the housing 23 with the help a first thread 19. Housing 23 includes a second screw thread 20 for screwing to a flange.

Figure 6B:
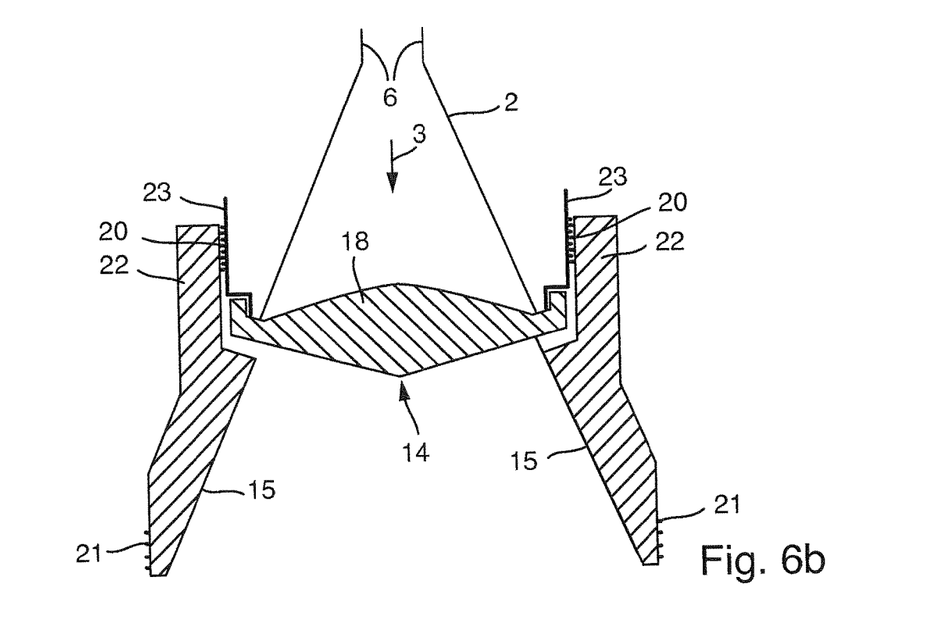
FIG. 6b is an antenna arrangement of the invention, in the case of which a lengthening component is secured to a housing by means of a securement element.

FIG. 6b shows another embodiment of an antenna arrangement 1 of the invention, in the case of which the lengthening component 15 is screwed by means of a securement component 22 to the second screw thread 20. Furthermore, the securement component 22 includes a third screw thread 21 for mounting to a flange.

Securement component 22 and lengthening component 15 are embodied from one piece of sheet material or an electrically conductive plastic. Lengthening component 15 can, however, also be composed of a material, which is electrically conductive only on the surface, such as, for example, a plastic with a surface metallizing. Furthermore, the horn shaped component 2, the lengthening component 15 and the round, hollow conductor 6 can be made of different materials. They must only have an electrical connection and with one another.

Figure 7A:
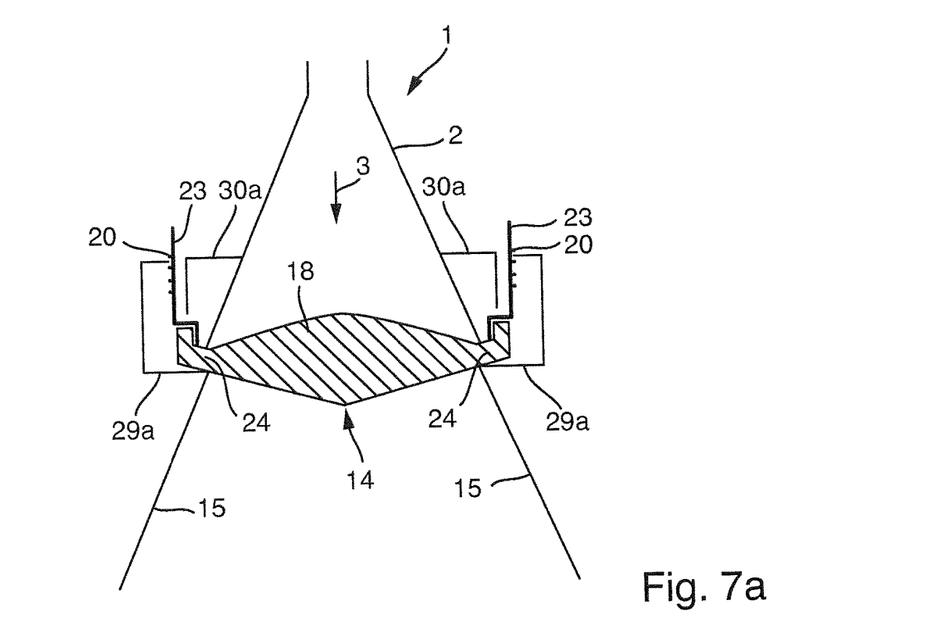
FIG. 7a is an antenna arrangement of the invention with a cavity resonator, in which constructive interference is present parallel to the radiated direction.

FIG. 7a shows an embodiment of an antenna arrangement 1 of the invention, in the case of which the securement component includes an annular cavity resonator 29a. The cavity resonator 29a surrounds the process isolating element 13 in the radial direction, so that microwaves, which escape in the radial direction from the edge region of the process isolating element 13, are reflected back approximately loss-freely. Cavity resonator 29a is embodied in such a way that microwaves, which escape from the edge region of the process isolating element 13, are reflected back on an inner wall of the cavity resonator 29a after an integer multiple of the half wavelength of the microwaves.

The microwaves, which escape from the edge region of the process isolating element 13, superimpose with the microwaves, which are reflected back on an inner wall of the cavity resonator 29a. Since the separation between the edge region of the process isolating element 13 and the inner wall of the cavity resonator 29a amounts to a whole numbered multiple of the half wavelength, constructive interference of the escaping microwaves and the reflected microwaves results and a large part of the microwaves escaped from the process isolating element 13 is reflected back into the process isolating element 13.

Housing 23 is manufactured of plastic and is electrically non-conductive. Therefore, there results, with reference to the electrical conductivity, an annular gap 24, through which a smaller part of the microwaves escapes. This small part of the microwaves is reflected back into the process isolating element 13 by an additional cavity resonator 30a, which acts same as the cavity resonator 29a, after an integer multiple of the half wavelength.

In the example of an embodiment corresponding to FIG. 7a, the path in the cavity resonator 29a, in which the constructive interference happens, is arranged parallel to the radiated direction 3.

Figure 7B:
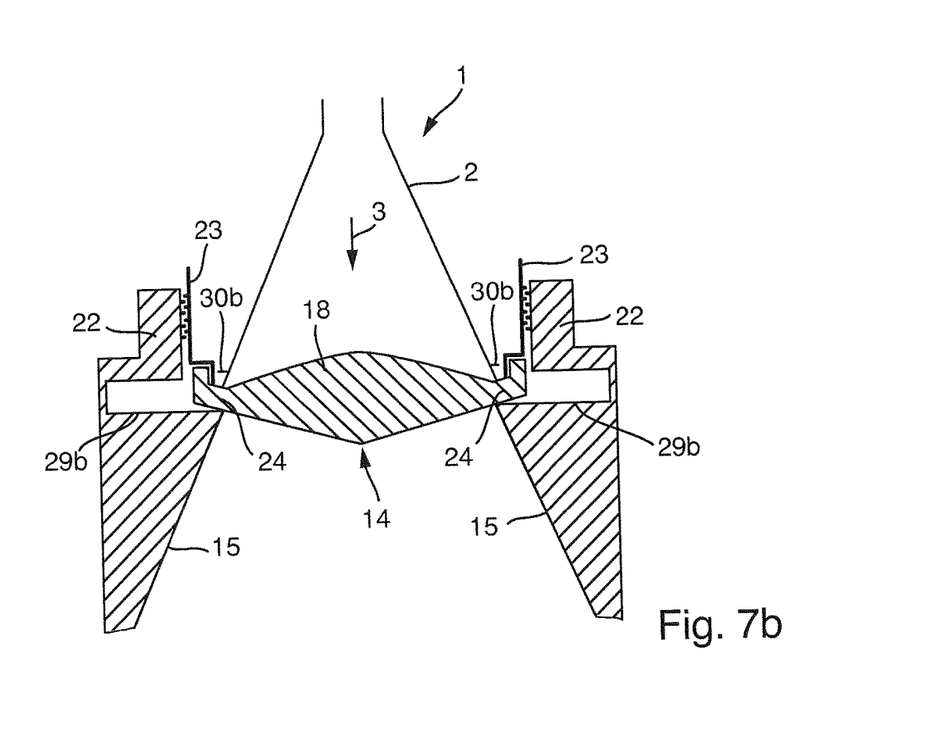
FIG. 7b is an antenna arrangement of the invention with a cavity resonator, in which constructive interference is present perpendicular to the radiated direction.

FIG. 7b shows another embodiment of the antenna arrangement 1 of the invention similar to the embodiment in FIG. 7a. Different is that the housing 23 is embodied of an electrically conductive material, whereby an annular gap 24 is smaller with reference to the electrical conductivity than in the case of the embodiment corresponding to FIG. 7a. Correspondingly, an additional cavity resonator 30b is smaller than the additional cavity resonator 30b in the embodiment corresponding to FIG. 7a. Furthermore, in the case of this embodiment, the path in the cavity resonator 29b, in which constructive interference occurs, is arranged perpendicular to the radiated direction 3.

Figure 8A:
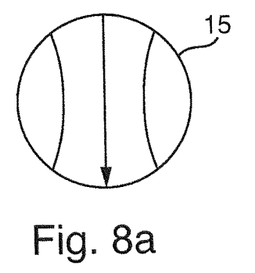
FIG. 8a is a TE11 mode in a lengthening component in the form of a hollow cylinder.

FIG. 8a shows a $TE_{11}$ mode in a lengthening component 15 in the form of a hollow cylinder.

Figure 8B:
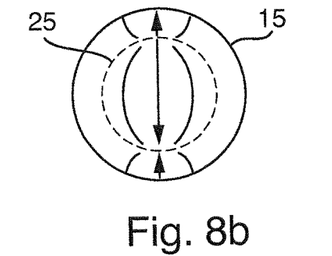
FIG. 8b is a TM11 mode in a lengthening component in the form of a hollow cylinder.

FIG. 8b shows a $TM_{11}$ mode in a lengthening component 15 in the form of a hollow cylinder. The $TM_{11}$ mode includes an annular region 25, in which the field strength is minimum.

Figure 8C:
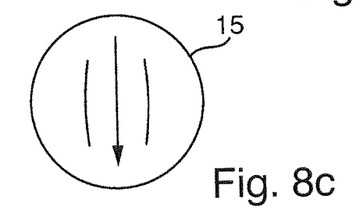
FIG. 8c is a superpositioning of a TE11 mode with a TM11 mode in a lengthening component in the form of a hollow cylinder.

FIG. 8c shows a superpositioning of a $TE_{11}$ mode with a $TM_{11}$ mode in a lengthening component 15 in the form of a hollow cylinder. The two modes were superimposed with determined power fractions. The superpositioning comes close to an ideal linear polarization. In this way, the microwaves are more strongly focused in the radiated direction 3.

Figure 9:
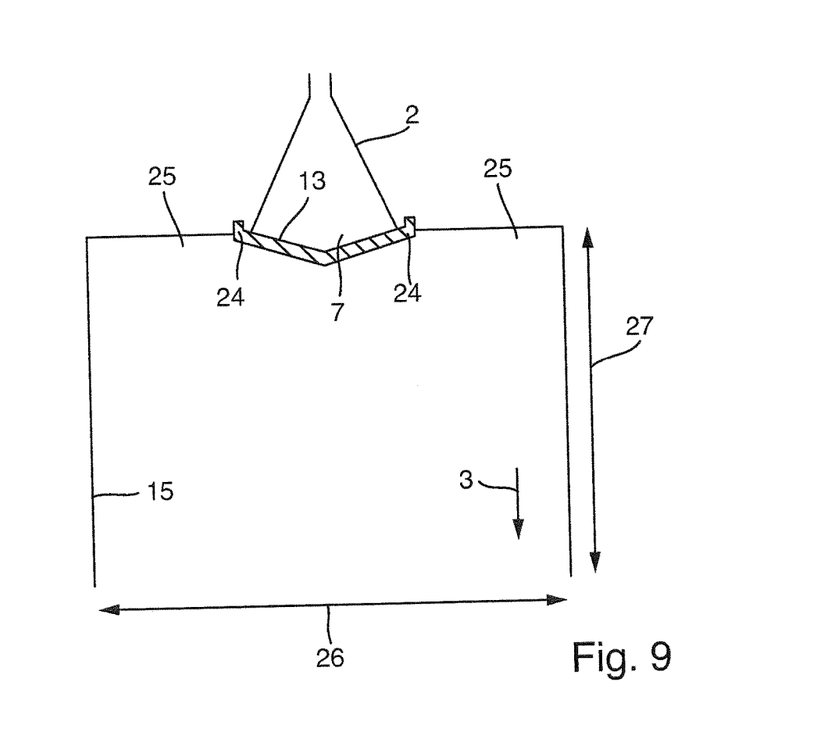
FIG. 9 is an antenna arrangement of the invention with a lengthening component in the form of a hollow cylinder.

FIG. 9 shows an embodiment of an antenna arrangement 1 of the invention with a lengthening component 15 in the form of a hollow cylinder. Lengthening component 15 includes an entrance opening 7, whose diameter is less than the diameter 26 of the lengthening component 15, wherein the lengthening component 15 is secured in the edge region of the entrance opening 7 to the edge region of the process isolating element 13, so that the lengthening component 15 has a, step in the radiated direction.

According to the invention, a superpositioning of a $TE_{11}$ mode with a $TM_{11}$ mode corresponding to FIG. 8c is produced in the lengthening component 15. For this reason, the lengthening component 15 is dimensioned in such a way that the annular region 25 of the $TM_{11}$ mode (see FIG. 8b) has a diameter, which corresponds approximately to the diameter of the process isolating element 13.

Since the diameter of the process isolating element 13 does not exactly agree with the annular region 25 of the $TM_{11}$ mode, directly after the process isolating element 13, a number of modes are formed, which are not capable of propagation in the hollow cylindrical lengthening component 15 and transfer into the energetically more favorable $TE_{22}$ mode. In order to avoid this, a sufficient length 27 of the lengthening component 15 is necessary, which amounts approximately to 16 times the wavelength of the microwaves. By way of this dimensioning, there lie at an exit opening 8 of the lengthening component 15 the $TE_{11}$ mode and the $TM_{11}$ mode in suitable power fractions, in order to build a field distribution of the invention as shown in FIG. 8c, which is radiated in the radiated direction 3. This antenna arrangement 1 is distinguished by a very great focusing for the diameter 26, along with a very high gain.

Figure 10:
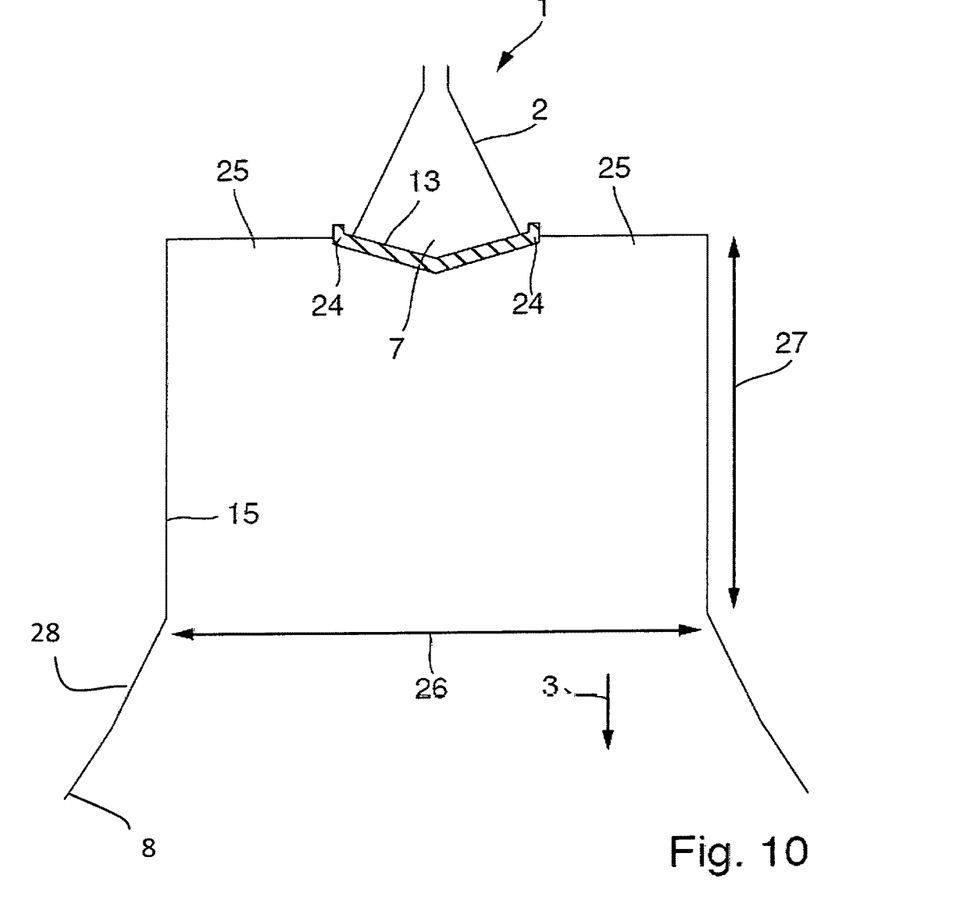
FIG. 10 is an antenna arrangement of the invention with a lengthening component in the form of a hollow cylinder and an exit opening, which has the shape of an exponential funnel.

FIG. 10 shows a further development of the embodiment of the antenna arrangement 1 corresponding to FIG. 9, in the case of which an exit opening 8 of the lengthening component 15 has the shape of an exponential funnel 28.

Alternatively, the lengthening component 15 can have for parallelizing the modes and, thus, for additional focusing a number of steps or no steps. For example, a second step can be embodied as a second horn shaped lengthening component. An aperture angle of the second lengthening component can be selected to deviate from the aperture angle of the first lengthening component. Advantageous is especially an increasing aperture angle with increasing widening.

The invention claimed is:

1. An antenna arrangement for a fill-level measuring device for ascertaining and monitoring a fill level of a medium in a comprising:
   a housing;
   a horn antenna having a horn shaped component for focusing microwaves and a microwave transmissive, process isolating element, which is provided in the region of the exit opening of the horn shaped component facing the medium and which isolates the interior of said horn shaped component from the interior of the container;
   at least one securement component; and
   a lengthening component for additional focusing of the microwaves, which lengthens said horn shaped component in the radiated direction of the microwaves, wherein:
   the process isolating element is embodied and arranged in such a manner that it isolates said horn shaped component and said lengthening component galvanically from one another;
   said lengthening component is embodied horn shaped and has an aperture angle, which corresponds approximately to an aperture angle of said horn shaped component, and said lengthening component includes an entrance opening, which is less than the exit opening of said horn shaped component;
   said horn antenna is at least partially arranged in said housing;
   said lengthening component has at least one securement component; and
   said lengthening component is secured to said housing by means of said at least one securement component.

2. The antenna arrangement as claimed in claim 1, wherein:
   said process isolating element is essentially embodied disc shaped and dimensioned in the radial direction larger than said exit opening of said horn shaped component.

3. The antenna arrangement as claimed in claim 1, wherein:
   said process isolating element is secured to said housing in an edge region thereof.

4. The antenna arrangement as claimed in claim 1, wherein:
   there is included with said at least one securement component at least one electrically conducting, hollow cylinder, which surrounds said process isolating element in the radial direction, so that microwaves, which escape in the radial direction from the edge region of said process isolating element, are reflected back approximately loss-freely.

5. The antenna arrangement as claimed in claim 1, wherein:
   there is included with said at least one securement component at least one annular cavity resonator, which surrounds said process isolating element in the radial direction, and is so dimensioned that microwaves, which escape in the radial direction from the edge region of said process isolating element, are reflected back approximately loss-freely.

6. The antenna arrangement as claimed in claim 5, further comprising:
   a hollow cylinder or said cavity resonator embodied in such a way that microwaves, which escape from the edge region of said process isolating element, after an integer multiple of a half wavelength, are reflected back on an inner wall of said hollow cylinder or of said cavity resonator.

7. The antenna arrangement as claimed in claim 1, wherein:
   said process isolating element includes a dielectric lens for more extensive focusing of the microwaves.

\* \* \* \* \*